United States Patent Office 2,996,525
Patented Aug. 15, 1961

2,996,525
CHEMICAL COMPOUNDS AND PROCESS FOR THE PREPARATION THEREOF
William S. Barnhart, Cranford, and Robert H. Wade, West Paterson, N.J., assignors, by mesne assignments, to Minnesota Mining and Manufacturing Company, St. Paul, Minn., a corporation of Delaware
No Drawing. Original application Apr. 4, 1955, Ser. No. 499,250. Divided and this application Dec. 5, 1958, Ser. No. 789,467
9 Claims. (Cl. 260—408)

This invention relates to novel perchlorofluorocarboxylic acid halides, and to a process for the preparation thereof.

In accordance with the present invention, noxel perchlorofluorocarboxylic acid halides are produced by halogenating perchlorofluorocarboxylic acids. Among the halogenating agents which may be used are phosphorus trichloride, phosphorus pentachloride, oxalyl chloride, phosphorus tribromide, thionyl bromide, and the similar fluorinating or iodinating agents. The acid fluorides, bromides, and iodides may also be prepared using a halogen exchange reaction of the acid chloride with hydrogen fluoride, hydrogen bromide, or hydrogen iodide.

The most important of these compounds are the perchlorofluorocarboxylic acid chlorides, and when these compounds are prepared by reacting a perchlorofluorocarboxylic acid with phosphorus trichloride, the phosphorus trichloride is present in a quantity of 0.3 to 1 mole per mole of the monoacid. Where diacids are used, 0.6 to 2 moles of the phosphorus trichloride are used per mole of the diacid. The quantity of phosphorus trichloride is correspondingly increased for each additional carboxyl group present in the acid, where polycarboxylic acids are used. When phosphorus pentachloride is used, it is present in a quantity of 1 to 1.5 moles per mole of the monoacid and is present in a quantity of 2 to 3 moles per mole of the diacid, with a corresponding increase for each additional carboxylic acid group present. When oxalyl chloride is used, it is present in a quantity of 1 to 3 moles per mole of the monocarboxylic acid and is present in a quantity of 2 to 6 moles per mole of the dicarboxylic acid. In the preparation of the acid fluorides, bromides, and iodides, a quantity of fluorinating, brominating, and iodinating agent equivalent to 1 to 3 moles per mole of the monocarboxylic acid is used, with this quantity being correspondingly increased, as above, for each additional polycarboxylic acid group present in the acid which is treated.

The perchlorofluorocarboxylic acids used in the method of this invention may be either mono- or polycarboxylic acids containing from about 4 to about 20 carbon atoms.

The perchlorofluorocarboxylic acids which may be used may be prepared in a variety of ways. For example, they may be produced by subjecting perhalogenated aliphatic olefins having at least 7 carbon atoms and being at least half fluorinated to oxidation conditions in the presence of a vigorous oxygen-containing oxidation reagent, such as free oxygen in the presence of ultraviolet light, free oxygen in the presence of ultraviolet light and elemental chlorine, free oxygen in the presence of elemental fluorine, and permanganate salts in a liquid medium. Preparation of the acids according to this method is disclosed in copending application Serial No. 452,706, filed August 27, 1954.

The acids may also be prepared by subjecting aliphatic perhalogenated high polymers to thermal cracking conditions to produce lower molecular weight materials having molecular weights in the oil or wax range and subjecting these materials to oxidation at a temperature not higher than about 10° C. in the presence of a permanganate salt in a liquid medium. Processes of this type are disclosed in copending application Serial No. 452,704, filed August 27, 1954, now Patent No. 2,950,300.

Another method for the preparation of perchlorofluorocarboxylic acids, which are useful in the present invention, comprises treating fluorine-containing telomers, having the formula $$M(CF_2-CX_1X_2)_nBr$$

in which M is a perhalomethyl radical having a total atomic weight not higher than 146.5, $X_1$ and $X_2$ are fluorine or chlorine atoms, and $n$ is an integer from 2 to 16, with fuming sulfuric acid at a temperature of at least 125° C. This process produces carboxylic acids having the formula $$Z(CF_2-CFCl)_{n-1}CF_2COOH$$

in which Z is a carboxylic acid radical or a perhalomethyl radical having a total atomic weight in an excess of 146.5 and $n$ is an integer from 2 to 16. The preparation of these acids is disclosed in copending application Serial No. 452,703, filed August 27, 1954, now U.S. 2,806,865.

The preferred process for the preparation of perchlorofluorocarboxylic acids useful in the process of the present invention is by the hydrolysis of telomers produced by telomerizing perhaloolefins using sulfuryl chloride as a telogen, the preferred telomer being the telomerization product of chlorotrifluoroethylene and sulfuryl chloride. The hydrolyzed telomer has the formula $$Z-CFCl-(CF_2CFCl)_{n-2}-CF_2-COOH$$

in which Z is a carboxylic acid radical or a perhalomethyl radical in which all the halogen atoms are fluorine or chlorine and $n$ is an integer from 2 to 16. The preparation of these acids is disclosed in copending application Serial No. 452,705, filed August 27, 1954, now U.S. 2,806,866.

The reaction temperature employed in the process of the present invention may be between about 20 and 100° C. and is preferably between about 30 and 60° C. At the completion of the reaction, when phosphorus pentachloride is used as the chlorinating agent, the temperature is raised to about 210° C. in order to boil off the phosphorus oxychloride by-product formed during the reaction.

Phosphorus pentachloride is the preferred chlorinating agent used in the process of the invention, and when the reaction is initiated, it is generally desirable to have the acid present in a slight excess or in the same molar ratio as the phosphorus pentachloride. Phosphorus pentachloride tends to plug the apparatus when the product is distilled, and it is therefore not generally used in excess unless sufficient acetic acid is introduced into the distillation mixture to eliminate this tendency.

The acid halides begin to form as soon as the perchlorofluorcarboxylic acid is mixed with the halogenating agent, such as phosphorus pentachloride, and the reaction is run to completion for a time which may be between a few minutes and about two hours. Generally, the reaction is complete within one hour.

The acid halides produced by the process of the present invention are particularly useful as intermediates in the preparation of important derivatives of perchlorofluorocarbozxylic acids, such as esters, amides, alcohols, and the like. One example of the use of the acid chlorides, i.e., the conversion of the acid chlorides to esters, is disclosed in copending application Serial No. 493,554, filed March 10, 1955, now Patent No. 2,856,388. The acid halides are also useful as bonding agents for halocarbon polymers and as cross-linking agents.

The invention will be further illustrated by reference to the following specific examples:

EXAMPLE 1

*Preparation of* $Cl(CF_2CFCl)_2CF_2COCl$

A 215 gram portion of $Cl(CF_2CFCl)_2CF_2COOH$ was added slowly to phosphorus pentachloride (185 grams, 1.5×0.59 mole) in a round bottom flask fitted with a reflux condenser. After the initial vigorous HCl evolution had ceased, the mixture was heated gently for 2 hours. Pentane (300 ml.) was added to the cooled solution to lessen $PCl_5$ solubility and the mixture was filtered. The product was distilled to give a 96 percent yield of acid chloride, B.P. 179.5° C.

EXAMPLE 2

*Preparation of* $Cl(CF_2CFCl)_3CF_2COCl$

Phosphorus pentachloride (407 grams; 1.95 moles) was added over a one-half hour period to 960 grams (2.0 moles) of $Cl(CF_2CFCl)_3CF_2COOH$ in a 3 liter flask fitted with a $CaCl_2$ tube. There was a vigorous evolution of HCl but the reaction temperature did not exceed 42° C. After heating for 1 hour on the steam bath, $POCl_3$ was removed by heating the flask gradually to 205° C. The clear liquid was transferred to a 1 liter flask and distilled under reduced pressure to give 94 grams of telomer acid (0.2 mole) and 878 grams (1.76 moles; 90 percent) of a clear, colorless liquid, B.P. 145° C./50 mm.; $n_D^{20}=1.3964$; $d_4^{20}=1.860$.

*Analysis.*—Calculated for $C_6OCl_5F_{11}$: hydrolyzable Cl, 7.1 percent; N.E.=249.2. Found: hydrolyzable Cl, 6.5; N.E.=2.47.

EXAMPLE 3

*Preparation of* $Cl(CF_2CFCl)_3CF_2COCl$

Phosphorus pentachloride (2268 grams; 10.9 moles) was added in portions with stirring to 5420 grams (11.3 moles) of $Cl(CF_2CFCl)_3CF_2COOH$ in a 12 liter three-necked flask, provided with a stirrer, a $CaCl_2$ tube, and a HCl trap. The mixture was stirred mechanically for 20 minutes after the final addition of $PCl_5$. The clear solution was transferred to a 5 liter distilling flask and heated until the pot temperature reached 200° C.; 1405 grams of $POCl_3$ were obtained. An additional 248 grams of forerun were collected at reduced pressure. The product was distilled through a 12 inch Vigreux column, B.P. 145° C./50 mm. The yield, based on $PCl_5$, was 5147.5 grams (10.3 moles; 94.5 percent).

EXAMPLE 4

*Preparation of* $Cl(CF_2CFCl)_3CF_2COBr$

A mixture of phosphorus tribromide (1 mole) and $Cl(CF_2CFCl)_3CF_2COOH$ (3 moles) is heated to 150° C. for 3 hours in a flask fitted with a $CaCl_2$ tube and a condenser. The crude product layer is then separated and phosphoric acid is removed by extraction with hexane. The product is distilled to give pure

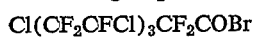
$Cl(CF_2CFCl)_3CF_2COBr$ in 90 percent yield.

EXAMPLE 5

*Preparation of* $BrOC(CF_2CFCl)_3COBr$

A mixture of phosphorus tribromide (1 mole) and $HOOC(CF_2CFCl)_3COOH$ (6 moles) is heated to 150° C. for 5 hours in a flask fitted with a $CaCl_2$ tube and a condenser. The crude product layer is separated, the phosphoric acid is removed by extraction with hexane, and the crude product is distilled to give

$BrOC(CF_2CFCl)_3COBr$ in 90 percent yield.

EXAMPLE 6

*Preparation of* $Cl(CF_2CFCl)_2CF_2COF$

Gaseous HF is bubbled through

$Cl(CF_2CFCl)_2CF_2COCl$ at a temperature of 100° C. for a period of about 3 hours. The crude product is distilled to give pure

$Cl(CF_2CFCl)_2CF_2COF$ in 85 percent yield.

It will be obvious to those skilled in the art that many modifications may be made within the scope of the present invention without departing from the spirit thereof, and the invention includes all such modifications.

This application is a division of application Serial No. 499,250, filed April 4, 1955, now abandoned.

We claim:

1. A compound having the formula

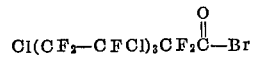
$$Cl(CF_2-CFCl)_3CF_2\overset{O}{\overset{\|}{C}}-Br$$

2. A compound having the formula

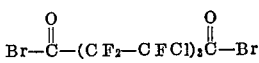
$$Br-\overset{O}{\overset{\|}{C}}-(CF_2-CFCl)_3\overset{O}{\overset{\|}{C}}-Br$$

3. An acid bromide of a perchlorofluorodicarboxylic acid, said acid having the structure

$$HOOC(CF_2-CFCl)_{n-1}CF_2COOH$$

in which $n$ is an integer from 2 to 16.

4. An acid bromide of a perchlorofluorocarboxylic acid, said acid having the structure

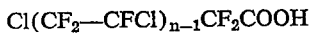
$$Cl(CF_2-CFCl)_{n-1}CF_2COOH$$

in which $n$ is an integer from 2 to 16.

5. An acid bromide of a perchlorofluorocarboxylic acid selected from the group consisting of

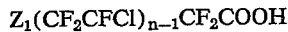
$$Z_1(CF_2CFCl)_{n-1}CF_2COOH$$

and

$$Z_2CFCl(CF_2CFCl)_{n-2}CF_2COOH$$

in which $n$ is an integer from 2 to 16, and $Z_1$ and $Z_2$ are selected from the group consisting of chlorine and a carboxylic acid radical.

6. An acid bromide of a perchlorofluorodicarboxylic acid, said acid having the structure

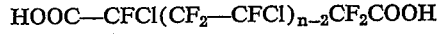
$$HOOC-CFCl(CF_2-CFCl)_{n-2}CF_2COOH$$

in which $n$ is an integer from 2 to 16.

7. A process for the preparation of perchlorofluorocarboxylic acid bromides which comprises reacting a brominating agent selected from the group consisting of phosphorus bromide and thionyl bromide with a perchlorofluorocarboxylic acid selected from the group consisting of

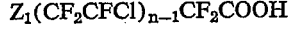
$$Z_1(CF_2CFCl)_{n-1}CF_2COOH$$

and

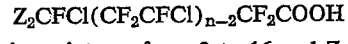
$$Z_2CFCl(CF_2CFCl)_{n-2}CF_2COOH$$

in which $n$ is an integer from 2 to 16 and $Z_1$ and $Z_2$ are selected from the group consisting of chlorine and a carboxylic acid radical.

8. The process of claim 7 in which the brominating agent is phosphorus tribromide.

9. The process of claim 7 in which the brominating agent is thionyl bromide.

References Cited in the file of this patent

UNITED STATES PATENTS

| | | |
|---|---|---|
| 2,502,478 | Padbury et al. | Apr. 4, 1950 |
| 2,567,011 | Diesslin et al. | Sept. 4, 1951 |
| 2,704,776 | La Zerte | Mar. 22, 1955 |
| 2,712,554 | Miller | July 5, 1955 |
| 2,717,871 | Scholberg et al. | Sept. 13, 1955 |